United States Patent

Hosono

[11] Patent Number: 4,625,587
[45] Date of Patent: Dec. 2, 1986

[54] SPEED CHANGE DEVICE FOR USE IN DRIVING AUXILIARY MACHINERY

[75] Inventor: Chihiro Hosono, Aichi, Japan

[73] Assignee: Aisin-Warner Kabushiki Kaisha, Aichi, Japan

[21] Appl. No.: 697,265

[22] Filed: Feb. 1, 1985

Related U.S. Application Data

[63] Continuation of Ser. No. 371,269, Apr. 23, 1982, abandoned.

[30] Foreign Application Priority Data

Apr. 24, 1981 [JP] Japan ................................ 56-62721

[51] Int. Cl.$^4$ ............................................. F16H 3/74
[52] U.S. Cl. ................................ 74/752 C; 74/781 R; 74/752 R
[58] Field of Search ................. 74/751, 752 R, 752 C, 74/752 E, 781 R, 15.4, 15.63

[56] References Cited

U.S. PATENT DOCUMENTS

| | | | |
|---|---|---|---|
| 2,953,039 | 9/1960 | McRae | 74/752 |
| 2,964,959 | 12/1960 | Beck et al. | 74/336 |
| 2,981,122 | 4/1961 | Kelly | 74/472 |
| 2,987,943 | 6/1961 | Lemieux et al. | 74/782 |
| 3,265,081 | 8/1966 | Stockton et al. | 137/54 |
| 3,469,473 | 9/1969 | Forster et al. | 74/781 |
| 3,631,950 | 1/1972 | Tanaka | 192/4 A |
| 3,738,198 | 6/1973 | Kell | 74/752 C X |
| 3,774,629 | 11/1973 | Enomoto | 137/116.3 |
| 4,110,054 | 8/1978 | Moeller | 403/373 |
| 4,308,940 | 1/1982 | Cadee | 192/103 FA |
| 4,344,338 | 8/1982 | Hattori et al. | 74/752 C |

FOREIGN PATENT DOCUMENTS

| | | | |
|---|---|---|---|
| 2801812 | 7/1979 | Fed. Rep. of Germany | 74/781 R |
| 1261302 | 12/1961 | France | 74/781 R |
| 55-51150 | 4/1980 | Japan | 74/781 R |

Primary Examiner—Kenneth J. Dorner
Assistant Examiner—Joseph M. Rolnicki
Attorney, Agent, or Firm—Cooper, Dunham, Griffin & Moran

[57] ABSTRACT

A speed change device for use in driving auxiliary machinery, comprising an auxiliary machinery driving pulley as an output member, an input member fixed to a driving shaft of an engine, a planetary gear transmission connecting changeably in speed between the auxiliary machinery driving pulley and the input member, and a hydraulic control unit for controlling the planetary gear transmission. The planetary gear transmission comprises a planetary gear set, a one-way clutch and a clutch equipped with a hydraulic servo. The hydraulic control unit has a centrifugal type governor valve which switches between feed and release a feed oil pressure to the hydraulic servo according to an increase or decrease in the number of revolutions of the driving shaft. The planetary gear set includes a planetary carrier connected to the auxiliary machinery driving pulley, a ring gear connected to the input member and a sun gear connected to support means which is fixed to the engine block through the one-way clutch, the ring gear and the sun gear being connected engageably and disengageably by the clutch equipped with the hydraulic servo.

5 Claims, 8 Drawing Figures

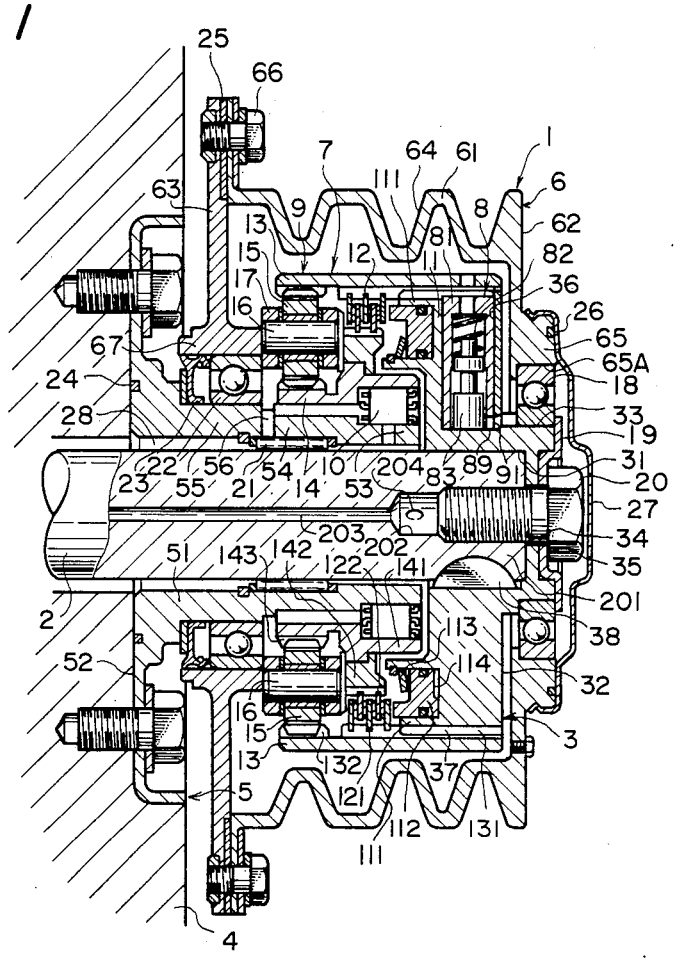
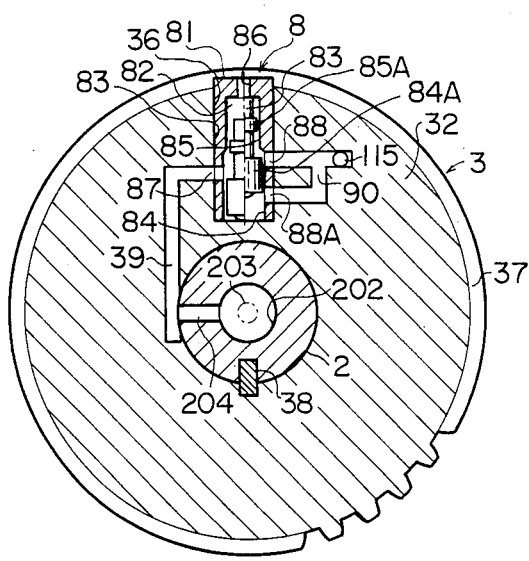
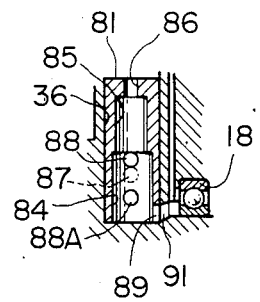
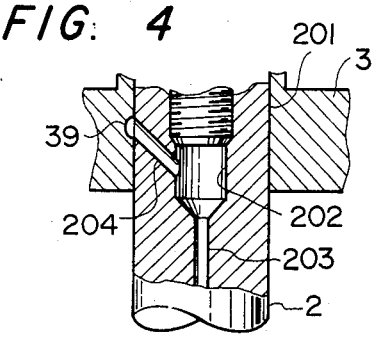

4,625,587

SPEED CHANGE DEVICE FOR USE IN DRIVING AUXILIARY MACHINERY

This is a continuation of application Ser. No. 371,269, filed Apr. 23, 1982, now abandoned.

BACKGROUND OF THE INVENTION (1) Field of the Invention

This invention relates to a speed change device for use in driving auxiliary machinery attached to internal combustion engines.

(2) Description of the Prior Art

In internal combustion engines such as automotive engines, for driving auxiliary machinery such as a generator, a water pump, a cooling fan, a cooler compressor and a power steering pump, there has been used a power transmission system comprising a pulley mounted on the crank shaft of an engine and a V-belt which transmission transmits the engine rotation directly at a fixed change gear ratio. Generally, these auxiliary machines are designed to exhibit required abilities at low engine speeds, so that at high engine speeds their abilities become excessive, thus causing loss of engine power and increase in fuel consumption.

For preventing the loss of engine power and for the saving in fuel consumption, it is effective to use, as the aforesaid power transmission system, a speed change device which decelerates upon increase in engine speed.

SUMMARY OF THE INVENTION

It is the object of the present invention to provide a speed change device for use in driving auxiliary machinery, capable of overcoming the above-mentioned problems, effecting deceleration by changing the gear ratio when the rotation of the driving shaft has become high, thus preventing the loss of engine power and excessive rotation of auxiliary machinery to improve the fuel economy, prolonging the life of auxiliary machinery and diminishing noise caused by high-speed rotations of auxiliary machinery, and having a hysteresis function for switching between deceleration and acceleration of auxiliary machinery.

The speed change device for use in driving auxiliary machinery in accordance with the present invention comprises a pulley as an output member for driving auxiliary machinery, an input member fixed to an engine driving shaft, a planetary gear transmission which connects the pulley and the input member so as to be changeable in speed, and a hydraulic control system for the planetary gear transmission, the planetary gear transmission comprising a planetary gear set, a one-way clutch and a clutch equipped with a hydraulic servo, the hydraulic control system having a centrifugal type governor valve which switches between feed and release an oil pressure to the hydraulic servo according to increase or decrease of the driving shaft revolution, the planetary gear set including a planetary carrier connected to the auxiliary machinery, capable of overcoming the above-mentioned problems, effecting deceleration by changing the gear ratio when the rotation of the driving shaft has become high, thus preventing the loss of engine power and excessive rotation of auxiliary machinery to improve the fuel economy, prolonging the life of auxiliary machinery and diminishing noise caused by high-speed rotations of auxiliary machinery, and having a hysteresis function for switching between deceleration and acceleration of auxiliary machinery.

The speed change device for use in driving auxiliary machinery in accordance with the present invention comprises a pulley as an output member for driving auxiliary machinery, an input member fixed to an engine driving shaft, a planetary gear transmission which connects the pulley and the input member so as to be changeable in speed, and a hydraulic control system for the planetary gear transmission, the planetary gear transmission comprising a planetary gear set, a one-way clutch and a clutch equipped with a hydraulic servo, the hydraulic control system having a centrifugal type governor valve which switches between feed and release an oil pressure to the hydraulic servo according to increase or decrease of the driving shaft revolution, the planetary gear set including a planetary carrier connected to the auxiliary machinery driving pulley, a ring gear connected to the input member and a sun gear connected to support means fixed to the engine block through the one-way clutch, the ring gear and the sun gear being connected engageably and disengageably through the above clutch equipped with the hydraulic servo.

BRIEF DESCRIPTION OF THE DRAWINGS

FIG. 1 is a sectional view of a speed change device for use in driving auxiliary machinery according to an embodiment of the present invention;

FIG. 2 is a sectional view of a governor valve, an input member, a driving shaft and oil paths constituting the speed change device of FIG. 1;

FIG. 3 is a sectional view of a cylinder of the governor valve;

FIG. 4 is a partial section through oil paths formed in the driving shaft;

DESCRIPTION OF PREFERRED EMBODIMENT

Figure 5:
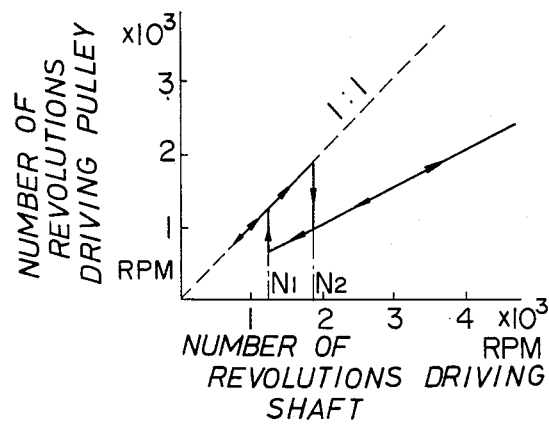
FIG. 5 is a graph comparing between the number of revolutions of the input member and that of a pulley for driving auxiliary machinery.

An embodiment of the present invention will be described hereinunder with reference to the accompanying drawings.

In this embodiment, a speed change device 1 for use in driving auxiliary machinery has an input member 3 in the form of a thick-walled flange mounted on a driving shaft 2, a support means or a hub 5 faced to an engine block 4, an auxiliary machinery driving pulley 6 in the form of a hollow drum supported by the input member 3 and the hub 5 both as bearings, a planetary gear transmission 7 disposed within the auxiliary machinery driving pulley 6 and connected to the input member 3, the hub 5 and the auxiliary machinery driving pulley 6, and a governor valve 8 fitted in the input member 3. The planetary gear transmission 7 comprises a planetary gear set 9, a one-way clutch 10 and clutch 12 equipped with a hydraulic servo. The planetary gear set 9 is composed of a ring gear 13, a sun gear 14, planet gears 15, planet gear pinions 16 and a planetary carrier 17.

In the driving shaft 2, as shown particularly in FIG. 4, a bolt hole 202 is formed in the center of a tip and portion 201 and a feed oil path 203 for the governor valve is formed through the axis of the driving shaft 2 so as to communicate with the bolt hole 202, and further formed is an oil path 204 which extends through the driving shaft 2 from the bolt hole 212 while tilting outward.

The input member 3 has a thick-walled flange plate 32 having a central hole 31, a tubular portion 33 which projects in one direction in the inside of the flange plate 32, a wall 35 having a central hole 34 mounted inside the tubular portion 33, and an annular cylinder 111 of the hydraulic servo 11 mounted circumferentially in a direction opposite to the tubular portion 33 at the outside of the flange plate 32. The flange plate 32 has a cylindrical hole 36 formed in its radial direction and a spline 37 formed on its outer periphery. The input member 3 is fitted of the tip end portion 201 of the driving shaft 2 through its central hole 31 so that the tubular portion 33 is positioned in a tip end direction (to the right in the figure), then fixed to the driving shaft 2 with a key 38 and tightened with a bolt 20 inserted in the hole 34 while interposing therebetween a combined washer and stopper 19 which holds a ball bearing 18 mounted on the outside of the tubular portion 33.

The governor valve 8 comprises a cylinder 81 and a valve 83 to one end of which is connected a spring 82. The cylinder 81 has a stepped inside diameter comprising a larger-diameter portion 84 and a smaller-diameter portion 85, the end of the larger-diameter portion being open and the end of the smaller-diameter portion having a drain port 86 formed through the axis thereof. With the drain port 86 directed outside (upward in the figure), the cylinder 81 is fitted in the cylindrical hole 36. The valve 83 has a land 84A adapted to fit in the larger-diameter portion 84 and a land 85A adapted to fit in the smaller-diameter portion 85, with the spring 82 being disposed at the smaller-diameter portion side thereby making the valve 83 slidable within the cylinder 81. The lands 84 and 85A define three spaced oil chambers 81A, 81B and 81C. In the side wall of the larger-diameter portion 84 of the cylinder 81 there are formed in predetermined positions an input oil port 87, an output oil port 88 and a pressure-release port 88A both connected to the hydraulic servo 11, and an oil discharge port 89 of the governor valve.

In the flange plate 32 of the input member, as shown particularly in FIGS. 2 and 3, there are formed an input oil path 39 communicating between the oil path 204 formed in the driving shaft 2 and the input oil port 87 of the governor valve, an oil path 90 communicating between the cylinder 111 of the hydraulic servo and the output oil port 88 as well as the pressure-release port 88A, and an oil discharge path 91 communicating the oil discharge port 89 with the outside of the input member 3.

The hub 5 comprises a stepped tubular portion 51 and a flange portion 52 formed at one end of the tubular portion 51. The tubular portion 51 is fitted over the portion of the driving shaft 2 between the input member 3 and the engine block 4 through a bearing 21, and the flange portion 52 is secured to the engine block 4 with an O-ring 24 put therebetween. The stepped tubular portion 51 comprises a smaller-diameter portion 53, a medium-diameter portion 54 and a larger-diameter portion 55 in order successively from its tip and side or the input member side. The one-way clutch 10 is connected to the outside of the smaller-diameter portion 53, while a ball bearing 22 and an oil seal 23 are fitted of the tip end side and the rear side, respectively, of the outside of the larger-diameter portion 55.

The auxiliary machinery driving pulley 6, which is in the form of a drum, comprises a cylindrical pulley portion 61 having V-shaped grooves formed on its outer periphery, a front annular plate 62 adjacent the tip end side of the pulley portion 61, the front annular plate 62 being provided in its inside with a forwardly projecting annular boss portion 65, and a rear annular plate 63 connected to the rear side of the pulley portion 61 through a seal member 25 with bolts 66, the rear annular plate 63 being provided in its inside with an axially extending cylindrical portion 67. The pulley 6 is fitted over the ball bearing 18 mounted on the tubular portion 33 of the input member 3 and the ball bearing 22 mounted on the large-diameter portion 55 of the hub 5 respectively through a hole 65A formed in the inside of the boss portion 65 and a hole 67A formed in the inside of the cylindrical portion 67 of the rear annular plate 63, with the oil seal 23 beng in slidable contact therewith, and thus the pulley 6 is rotatably carried on the input member 3 and the support means for the one-way clutch, namely, the hub 5.

The planetary gear transmission 7 is mounted within the auxiliary machinery driving pulley 6, and the planetary gear set 9 is disposed on the outer peripheral side of the medium diameter portion 54 of the hub 6. The ring gear 13 has aspline 131 formed on the inside of its front end portion, and through the spline 131 it is connected to the spline 37 formed on the outside of the input member 3. Inside an intermediate portion of the ring gear 13 is mounted a friction engaging plate 121 of the clutch 12, and inside a rear portion thereof is formed a gear 132. The sun gear 14 is connected at the inside of its front end portion 141 to the smaller-diameter portion 53 of the hub 5 through the one-way clutch 10, and on the outside of its intermediate portion is formed an annular projection 142 to which is mounted a friction engaging plate 122, and a gear 143 is formed on the outside of the rear portion of the sun gear 14 in a position opposed to the gear 132. Between the gears 132 and 143 are disposed plural planet gears 15 each mounted on the planet gear pinion 16 as a support shaft, the planet gear pinions 16 being supported by the planetary carrier 17 which is integrally connected to the cylindrical portion 67 of the rear side annular plate of the auxiliary machine driving pulley 6.

The clutch 12 is constituted of the friction engaging plates 121 and 122 which are overlapped alternately with each other, and the hydraulic servo 11 for driving the clutch 12 comprises the annular cylinder 111 formed on the input member 3, an axially slidable annular piston 112 mounted within the cylinder 111 and a returning, truncated cone spring 113, The piston 112 is in abutment with a front end side (right side in the figure) of the clutch 12, and an oil chamber 114 is formed between the cylinder 111 and the piston 112, with an oil port 115 which opens to the oil chamber 114 being connected to the oil path 90 extending from the governor valve 8.

A cap 27 which covers the ball bearing 18, the combined washer and stopper 19 and the bolt 20 is attached to the annular boss portion 65 projecting in the front end portion of the auxiliary machinery driving pulley 6 with an O-ring 26 put therebetween.

The speed change device 1 for use in driving auxiliary machinery is sealed against oil by means of the oil seal 23, the O-ring 24 of the hub 5, the seal member 25 of the auxiliary machinery driving pulley 6 and the O-ring 26 of the cap 27.

A radial hole 56 formed in the boundary between the medium-diameter portion 54 and the larger-diameter portion 55 of the hub 5, and a gap 28 formed between the inside of the larger-diameter portion 55 and the outside of the driving shaft 2, both constitute an oil discharge path in the speed change device 1.

The following description is now provided about the operation of this embodiment.

First regarding the operation of the clutch 12, when the governor pressure fed from the governor valve 8 to the oil chamber 114 through the oil path 90 is at high level, the piston 112 undergoes an oil pressure and moves to the left in the figure against the bias of the truncated cone spring 113, so that the clutch 12 equipped with the hydraulic servo 11 becomes engaged, whereby the ring gear 13 and the sun gear 14 are connected with each other. On the other hand, when the governor pressure fed from the governor valve 8 which is mounted on an output shaft within the engine cover, to the oil chamber 114 through the oil path 90 has been released into a low level through a drain circuit consisting of oil port 115, oil path 90, pressure-release port 88A, oil chamber 83A, oil discharge port 89 and oil discharge path 91, the piston 112 moves to the right in the figure by virtue of the biasing force of the spring 113, so that the clutch 12 becomes disengaged, whereby the ring gear 13 and the sun gear 14 are disconnected from each other.

Next, the entire operation will be described hereinunder.

Figure 6:
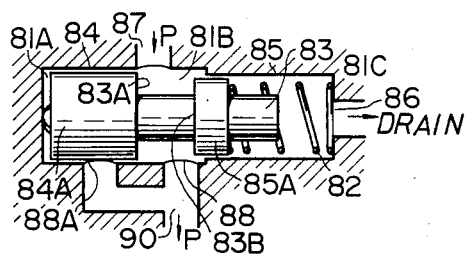
FIG. 6 illustrates an operation of the governor valve.

As long as the number of revolutions of the governor valve 8 or the number of revolutions of the driving shaft 2 is smaller than a first present number of revolutions $N_2$ shown in the graph of FIG. 5, the resultant force of the spring force of the spring 82 plus the hydraulic force exerted on the valve 83 is stronger than the centrifugal force of the valve 83, so that the valve 83 of the governor valve is positioned to the left as shown in FIG. 6, that is, the oil chamber 81B is set in a position opening to both the input oil port 87 and the output oil port 88, therefore a high-level governor pressure is applied to the piston 112 of the hydraulic servo, thus keeping the clutch 12 engaged between the ring gear 13 and the sun gear 14. As a result, the ring gear 13, the planet gears 15 and the sun gear 14 rotate together and the rotation of the driving shaft 2 is transmitted at a gear ratio of 1:1 to the auxiliary machinery driving pulley through the planetary carrier 17.

Figure 7:
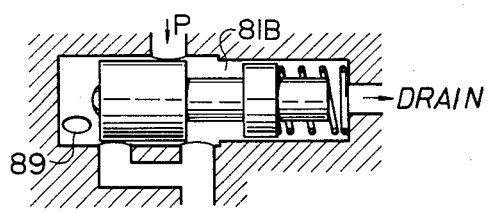
FIG. 7 illustrates an operation of the governor valve.
Figure 8:
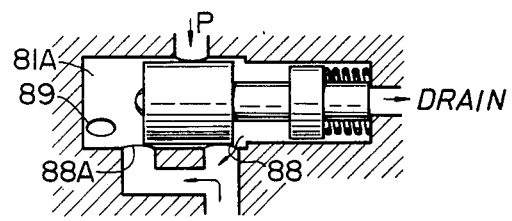
FIG. 8 also illustrates an operation of the governor valve.

When the number of revolutions of the driving shaft 2 or the number of revolutions of the governor valve 8 has increased and reached to the first preset number of revolutions $N_2$, the valve 83 is brought into an intermediate position as shown in FIG. 7, that is, the oil chamber 81B is set in a position closing the input oil port 87, so that a feed oil pressure P which has been applied to end faces 83A and 83B of the valve 83 is eliminated and the balance of forces exerted on the valve 83 becomes such that the spring force of the spring 82 plus the force based on the centrifugal force of oil is smaller than the centrifugal force of the valve 83, thus allowing the valve 83 to move instantaneously to the right as shown in FIG. 8, that is, allowing the oil chamber 81A to be set in a position opening to both the pressure-release port 88A and the oil discharge port 89. As a result, the governor pressure which has been applied to the piston 112 of the hydraulic servo is released to a low level and at the same time the oil in the oil chamber 114 is discharged through the foregoing drain circuit, thus causing the clutch 12 between the ring gear 13 and the sun gear 14 to become disengaged. Consequently, the rotation of the ring gear 13 tries to rotate the sun gear 14 in the reverse direction through the planet gears 15. However, because the one-way clutch 10 is interposed between the hub 5 and the sun gear 14, the sun gear 14 does not reverse its rotation and consequently it comes into a fixed state, so that the number of revolutions of the driving shaft 2 or the number of revolutions of the ring gear 13 is decreased into the number of revolutions of the planet gear pinions 16 revolving round the sun gear 14, and this decelerated revolution is transmitted from the planetary carrier 17 to the auxiliary machinery driving pulley 6. The reduction ratio is as follows:

$$\frac{\text{Number of revolutions of the driving shaft 2}}{\text{Number of revolutions of the pulley 6}} = \frac{1}{\frac{Z_3}{Z_1 + Z_3}}$$

$Z_1$: Number of teeth of the sun gear 14
$Z_3$: Number of teeth of the ring gear 13

In the governor valve 8, while the feed oil pressure P is introduced into the oil chamber 81B, a hydraulic force is exerted on the valve 83 in the left direction in the figure by the oil pressure P because there is a difference in area between the end faces 83A and 83B of the valve 83. Thus, in the increasing and decreasing stages of revolution the valve 83 moves and reaches the state of FIG. 7, namely, a switching point. In this case, in the acceleration stage the above hydraulic force acts on the valve 83, while in the deceleration stage such force does not act thereon, so that the number of revolutions $N_1$ reaching the side switching point in the deceleration stage becomes smaller than the number of revolutions $N_2$ reaching the said switching point in the acceleration stage, and thus a hysteresis function is attained.

Because of such hysteresis function, until the driving shaft 2 is slowed down and reaches the second preset number of revolutions $N_1$ smaller than the first preset number of revolutions $N_2$ in the decreasing stage of revolution of the driving shaft 2, the spring force of the spring 82 is weaker than the centrifugal force of the valve 83, so there is fed no governor pressure to the hydraulic servo 11, thus keeping the clutch 12 disengaged and allowing the auxiliary machinery driving pulley 6 to rotate in a decelerated state, but when the number of revolutions of the driving shaft 2 becomes smaller than the second preset value $N_1$, the feed oil pressure P is introduced into the oil chamber 81B and the balance of force exerted on the valve 83 becomes such that the hydraulic force based on oil pressure P plus the spring force of the spring 82 plus the force based on the centrifugal force of oil is larger than the centrifugal force of the valve 83, so that the valve is set instantaneously to the left side as shown in FIG. 6, whereby a high-level governor pressure is fed to the hydraulic servo 11, thus causing the piston 112 to move to the left in the figure and the clutch 12 to become engaged. As a result, the gear ratio returns to the original ratio, that is, the rotation of the driving shaft 2 is transmitted to the auxiliary machinery driving pulley at a gear ratio of 1:1.

The present invention is not limited to the above embodiment. The pressure-released oil from the governor valve may be returned to the oil pan in the engine by forming a pressure-released oil path in the driving shaft separately from the feed oil path, or the governor valve may be mounted on the driving shaft portion within the engine room whereby the wall thickness of the input member can be made smaller thereby permitting the entire device to be shortened in the axial direction. Furthermore, by integrating the hub with the engine cover it is made possible to omit the provision of the oil seal between the hub and the engine cover and that of the bearing between the hub and the driving shaft.

In the hereinabove described construction, the speed change device for use in driving auxiliary machinery in accordance with the present invention employs the planetary gear transmission whereby the rotation of the auxiliary machinery driving pulley can be decreased when the rotation of the driving shaft of an internal combustion engine has become high, so that the loss of engine power and an excessive rotation of auxiliary machinery can be prevented and it becomes possible to improve the fuel economy, further an extra horsepower at high engine speeds increases and it is possible to prolong the life of auxiliary machinery and diminish noises from auxiliary machinery at high engine speeds. Furthermore, the hysterises function in the deceleration and acceleration of the auxiliary machinery driving pulley is effective in preventing hunting, and thus the speed change device in accordance with the present invention is suitable as an auxiliary machinery driving device in internal combustion engines wherein acceleration and deceleration are repeated at small intervals in practical use such as vehicular engines.

We claim:

1. A speed change device for use in driving auxiliary machinery comprising:
    an auxiliary machinery driving pulley as an output member;
    an input member fixed to a driving shaft of an engine;
    a planetary gear transmission changeably connected to said auxiliary machinery driving pulley and said input member, said planetary gear transmission comprising a planetary gear set, said planetary gear set comprising a planetary carrier connected to said auxiliary machinery driving pulley, a ring gear connected to said input member and a sun gear connected to support means fixed to an engine block through a one way clutch, said ring gear equipped with a tubular member having an axis identical to the axis of the driving shaft of said engine and said input member, said ring gear and sun gear being connected engageably and disengageably by clutch, said clutch being equipped with a hydraulic servo and arranged between said input member and said engine block, said hydraulic servo being parallel to said one way clutch in the axial direction and arranged between said input member and said planetary gear set; and
    a hydraulic control unit for controlling said planetary gear transmission, said hydraulic control unit having a centrifugal type governor valve switchable between feed and release for supplying feed oil pressure to said hydraulic servo, and arranged inside said input member, wherein said governor valve is mounted in a radial direction with respect to the driving shaft and comprises a cylinder and a valve, said cylinder having a larger-diameter portion at a radial center side and a smaller-diameter portion at the radial outside, said valve being disposed within said cylinder in such a state that a spring is attached to the radial outside of said valve, said valve having two lands respectively fitted in said larger-diameter portion and said smaller-diameter portion of said cylinder, said larger-diameter portion having a side wall in which are formed an oil discharge port, a pressure-release port from said hydraulic servo, an input oil port of said governor valve and an output oil port to said hydraulic servo at predetermined intervals and in order successively from the radial center side, said governor valve having a hysteresis function in its operation caused by the difference in area between opposite end faces of each of said two lands.

2. A speed change device for use in driving auxiliary machinery according to claim 1, wherein said governor valve has a hysteresis function in its switching operation between feed and release of the feed oil pressure to said hydraulic servo according to an increase or decrease in the number of revolutions of the driving shaft.

3. A speed change device for use in driving auxiliary machinery according to claim 1, wherein said support means is a hub comprising a flange portion connected to the engine block and a tubular portion in which is slidably fitted the driving shaft, said input member is in the form of a flange mounted on a front end portion of the driving shaft of the engine and extending in a radial direction with respect to the driving shaft, said ring gear is connect to an outer peripheral side of said flange as the input member so that it extends in a rearward direction, said auxiliary machinery driving pulley as the output member is in the form of a hollow drum having circumferential V-shaped grooves for receiving V-belts formed on the outside thereof and having a centrally located bearing hole, in the interior of a drum-like pulley is disposed said planetary gear set, said one-way clutch, said clutch equipped with said hydraulic servo and said input member, a rear side wall of said drum-like pulley and said planetary carrier are connected integrally with each other, and said drum-like pulley is rotatably supported at its front end side by said input member of said driving shaft and at its rear end side by said hub through bearings.

4. A speed change device for use in driving auxiliary machinery in accordance with claim 3 wherein the rear side wall portion is separable from the pulley portion having circumferential V-shaped grooves and a boss portion at the front end thereof and wherein said pulley portion is replaceable.

5. A speed change device for use in driving auxiliary machinery according to claim 1, characterized by being oil-sealed by disposing an oil seal between a drum-like, auxiliary machinery driving pulley and said hub and by attaching a cap through an O-ring to a boss portion formed at a front end of said pulley.

* * * * *